Patented May 24, 1949

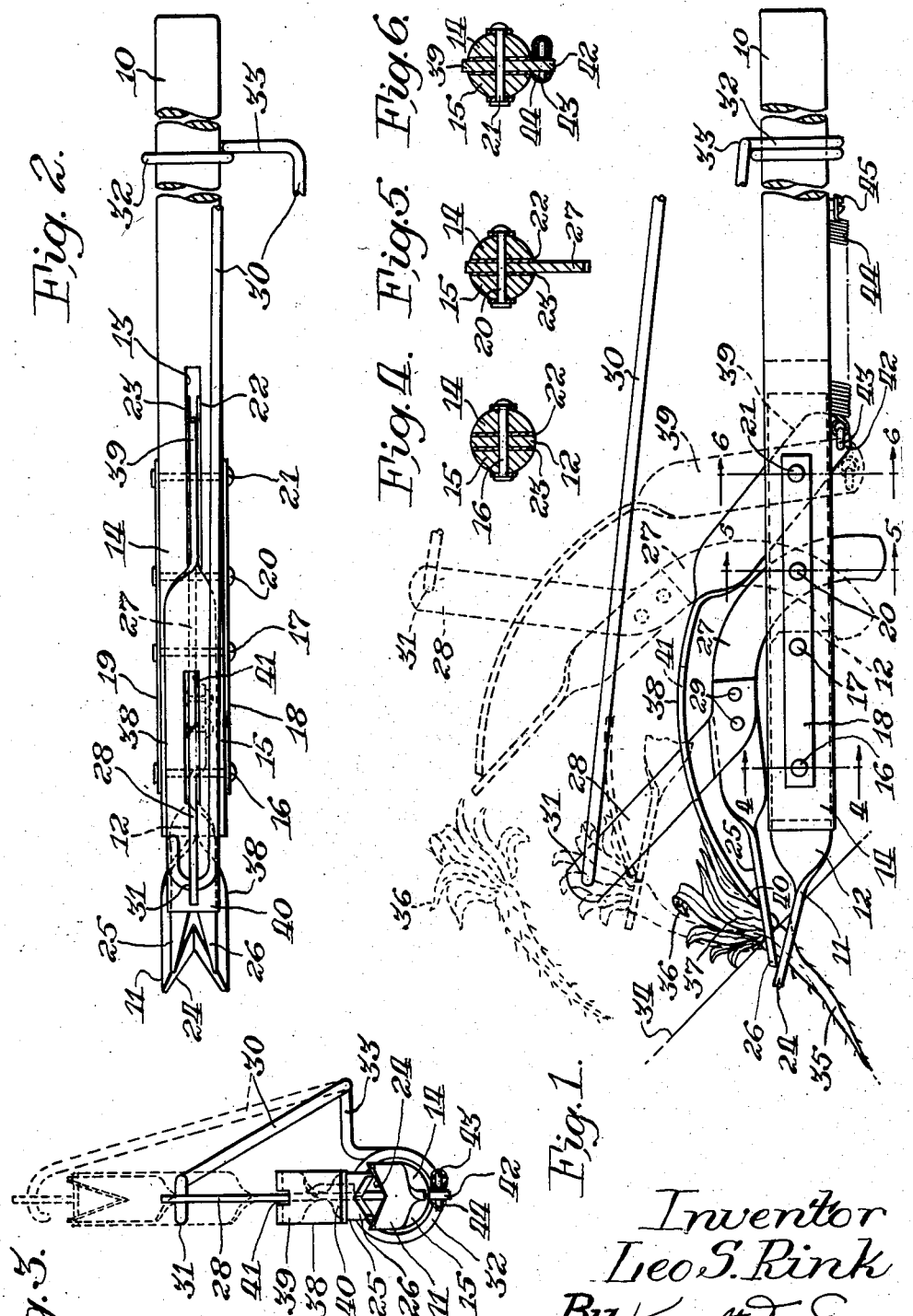

2,470,900

UNITED STATES PATENT OFFICE 2,470,900

WEEDER WITH WEED STRIPPER

Leo S. Rink, Moline, Ill.

Application May 13, 1947, Serial No. 747,654

10 Claims. (Cl. 254—132)

1

This invention relates to a new and improved weeder with weed stripper and has for one of its principal objects the provision of means for engaging a weed in the ground, extracting it from the ground, and finally stripping it from the weeder.

This invention is an improvement over my copending application entitled Weeding device, filed October 18, 1945, and having Serial Number 623,093.

An important object of this invention is to provide a weed removing device operable manually in a standing position and arranged and constructed to strip the weed from the removing device simultaneously with the same operation employed to remove the weed from the ground.

Another important object of this invention is the provision of a relatively simple weeder economically manufactured, easily operated, light in weight, compact, and very effective in accomplishing its dual function of removing weeds from a growing position and stripping them from the weeder.

A further object of this invention is to provide a weeder having means capable of removing a weed from the ground and immediately and successively thereafter stripping the weed from the weeder upon executing a simple manual movement of an operating portion of the weeder.

Other and further important objects of this invention will become apparent from the disclosures in the following specification and accompanying drawings.

In the drawings:

Figure 1 is a side elevational view of the weeder of this invention.

Figure 2 is a top plan view of the device as shown in Figure 1.

Figure 3 is a front elevational view of the device as shown in Figure 1.

Figure 4 is a sectional view taken on the line 4—4 of Figure 1.

Figure 5 is a sectional view taken on the line 5—5 of Figure 1.

Figure 6 is a sectional view taken on the line 6—6 of Figure 1.

As shown in the drawings:

The reference numeral 10 indicates generally a support or hand pole preferably of wood and having a spade 11 fixedly mounted at its lower end. The spade 11 comprises an upwardly extending portion 12 which passes within a slot 13 in the lower end of the hand pole 10 as shown in Figures 2 and 4. The slot 13 extends upwardly from the bottom of the pole and defines spaced

2 side portions 14 and 15. Bolts or rivets 16 and 17 pass through aligned openings in the side portions 14 and 15 of the pole and also in the upwardly extending portion 12 of the spade 11. The spade is thus fixed with respect to the hand pole.

In order to reinforce the wooden hand pole, steel side plates 18 and 19 are placed along the outside of the side portions 14 and 15 of the hand pole and are held in position by the bolts 16 and 17 and also bolts or rivets 20 and 21. The hand pole is additionally reinforced by bearing or wear plates 22 and 23 lining the side walls of the slot 13.

The lower or ground penetrating end 24 of the spade 11 is forked as shown in Figures 2 and 3 and is adapted to easily penetrate the ground because of its sharpened edge. The forked end 24 substantially encircles the root of a weed. A second ground penetrating spade 25 is equipped with a lower end fork portion 26 which in one position of the spade lies on and immediately above the fork of the fixed spade so that when the first spade 11 penetrates the ground the second spade similarly penetrates the ground. The fork 26 substantially encircles the weed at a point spaced slightly above the first spade fork 24 and directly beneath the wide spreading foliage of a weed above the surface of the ground.

The second spade 25 has a rearwardly extending portion 27 curved downwardly to extend through the slot 13 in the hand pole and is journaled for hinging rotation on the bolt 20 between the bearing plates 22 and 23. An upwardly extending arm 28 is riveted or otherwise fixedly attached at its lower end at 29 to the portion 27 of the second or hinged spade 25. A link 30 is attached to the upper end of the arm 28 at 31 and projects upwardly adjacent the hand pole 10 to a position near the top thereof whereupon it is coiled loosely around the hand pole at 32. The coil 32 combined with a lateral extension 33 as best shown in Figure 2 forms a hand grip for the operator of the weeder. An upward pull of the rod 30 causes the second spade 25 to be swung upwardly about its hinge pin 20. The forked end 26 is now spaced considerably above the fixed spade 11 and is above the ground line 34 which as indicated in Figure 1 is sloped.

In operation the joint spades 11 and 25 are pushed into the ground as shown in Figure 1 so that the forks 24 and 26 partially surround the root 35 of a weed 36. The hinged spade is positioned just beneath the wide spreading foliage 37 of the weed 36. The next step in the operation is to pull upwardly on the coil 32 and its lateral extension 33 whereupon the second spade 25 moves upwardly about its hinge 20 prying the weed 36 from the ground away from the fixed spade 11. This position in the cycle of operations is shown in the first dashed line position of the movable spade with the weed 36 held in the fork thereof and with the weed substantially out of the ground.

A stripper member 38 constituting a curved arm has its rear and upper end 39 journally mounted on the pin or bolt 21 between the wear plates 22 and 23. The hinge pin 21 is spaced upwardly on the hand pole 10 from the hinged attachment of the second spade at 20. The lower end 40 of the curved stripper member rests on and slides over the top surface of the forward end of the hinged spade. The arm 38 has a central longitudinally extending slot 41 within which the arm 28 is permitted to have unhindered swinging movement. The spacing of the pivots 20 and 21 causes the stripper to move forwardly and downwardly over and longitudinally of the fork 26 of the hinged spade 25 upon swinging of the spade 25 upwardly away from the fixed spade 11.

In the final stage of weeder operation the stripper rides longitudinally over the top of the second spade upon continued upward movement of the second spade by the rod 30. The stripper thus pushes the weed 36 out of its engagement with the fork 26 as indicated by the second dashed line position of the spade 25 and the stripper 38 in Figure 1.

A continued rearward extension 42 of the stripper 38 provides an attachment 43 for a spring 44. The spring is anchored at 45 by a wood screw or the like. The spring 44 acts to normally urge the forward end 40 of the stripper 38 downwardly against the hinged spade 25 thus making weed stripping positive. When the pull rod 30 is raised the spring 44 additionally acts to return the hinged spade 25 to its position adjacent the fixed spade 11 at which time the weeder is ready to remove another weed. The spring tends to urge both spades and stripper arm in close contacting relationship.

Various details of construction may be varied throughout a wide range without departing from the principles disclosed herein and I therefore do not propose limiting the patent granted hereon otherwise than as necessitated by the appended claims.

What is claimed is:

1. A weeder comprising a support, a ground penetrating spade fixedly positioned on said support, a second ground penetrating spade hinged on said support for swingable movement from a position immediately above and adjacent said first spade to a position spaced from and above said first spade, means for effecting swinging movement of said second spade, and a stripping member hinged for swinging movement above said second spade about a point spaced from the hinge of said second spade, said stripping member being arranged and constructed to slide longitudinally of said second spade upon swinging movement of said second spade.

2. A weeder comprising a hand pole, a first ground penetrating forked spade fixedly mounted on the lower end of said hand pole, a second ground penetrating forked spade hingedly mounted on said hand pole and arranged and constructed to move from a position upon and adjacent said first forked spade to a position spaced upwardly therefrom, a stripping member hingedly mounted on said hand pole at a position spaced from the hinge mounting of said second spade, said stripping member being adapted to lie on the top of said second spade, and means for raising the second spade whereupon the stripping member moves longitudinally of said second spade in a sliding movement thereover.

3. A weeder comprising a hand pole, a first ground penetrating forked spade fixedly mounted on the lower end of said hand pole, a second ground penetrating forked spade hingedly mounted on said hand pole and arranged and constructed to move from a position upon and adjacent said first forked spade to a position spaced upwardly therefrom, a stripping member hingedly mounted on said hand pole at a position spaced from the hinge mounting of said second spade, said stripping member being adapted to lie on the top of said second spade, means for raising the second spade whereupon the stripping member moves longitudinally of said second spade in a sliding movement thereover, and spring means associated with said stripping member arranged and constructed to urge the stripping member down into contact with the second spade.

4. A weeder comprising a hand pole, a first ground penetrating forked spade fixedly mounted on the lower end of said hand pole, a second ground penetrating forked spade hingedly mounted on said hand pole and arranged and constructed to move from a position upon and adjacent said first forked spade to a position spaced upwardly therefrom, a stripping member hingedly mounted on said hand pole at a position spaced from the hinge mounting of said second spade, said stripping member being adapted to lie on the top of said second spade, means for raising the second spade whereupon the stripping member moves longitudinally of said second spade in a sliding movement thereover, said stripping member having an extension beyond its hinge attachment to the hand pole, and spring means attached to said stripping member extension and to said hand hole and arranged and constructed to urge said stripping member down into contact with said second spade.

5. A weeding device comprising a hand pole having a slot extending upwardly from the bottom of the pole, a downwardly extending first spade having an upward and rearward extension positioned within said slot, means for fixedly holding said spade extension in said slot, a second spade positioned above said first spade and having an upwardly and rearwardly curved portion pivotally mounted within said slot, means for swinging said second spade upwardly about its pivotal mounting to a position spaced above said first spade, and a weed stripper including an arm positioned on said second spade and adapted to slide longitudinally thereover.

6. A weeding device comprising a hand pole having a slot extending upwardly from the bottom of the pole, a downwardly extending first spade having an upward and rearward extension positioned within said slot, means for fixedly holding said spade extension in said slot, a second spade positioned above said first spade and having an upwardly and rearwardly curved portion pivotally mounted within said slot, means for swinging said second spade upwardly about its pivotal mounting to a position spaced above said first spade, and a weed stripper including an arm positioned on said second spade and being adapted to slide longitudinally thereover, said weed stripper pivotally mounted within said slot above the pivotal attachment of said second spade.

7. A weeding device comprising a hand pole having a slot extending upwardly from the bottom of the pole, a downwardly extending first spade having an upward and rearward extension positioned within said slot, means for fixedly holding said spade extension in said slot, a second spade positioned above said first spade and having an upwardly and rearwardly curved portion pivotally mounted within said slot, means for swinging said second spade upwardly about its pivotal mounting to a position spaced above said first spade, a weed stripper including an arm positioned on said second spade and being adapted to slide longitudinally thereover, said weed stripper being pivotally mounted within said slot above the pivotal attachment of said second plate, said weed stripper having a rearward extension beyond its pivotal mounting, and spring means joining said rearward extension and said hand pole, said spring means adapted to urge said weed stripper down against the top surface of said second spade.

8. A weeding device including a hand pole having a central slot extending upwardly from the bottom of the pole, a first forked end spade anchored in the bottom of said slot, a second forked end spade hinged in said pole slot above said first spade anchor, said second spade in its lowermost position engaging the top of said first spade, said second spade having a forwardly extending arm, a rod joining the outer end of said arm and extending upwardly to a position near the top of said hand pole and adapted to be manually slid along said pole to effect a raising and lowering of said second hinged spade, and a stripper arm hinged in said pole slot above said hinged attachment of said second spade, said stripper arm adapted to slidably ride on the top surface of said second spade from a position upwardly of the forked end to the end thereof upon an upward movement of the second hinged spade.

9. A weeding device including a hand pole having a central slot extending upwardly from the bottom of the pole, a first forked end spade anchored in the bottom of said slot, a second forked end spade hinged in said pole slot above said first spade anchor, said second spade in its lowermost position engaging the top of said first spade, said second spade having a forwardly extending arm, a rod joining the outer end of said arm and extending upwardly to a position near the top of said hand pole and adapted to be manually slid along said pole to effect a raising and lowering of said second hinged spade, and a stripper arm hinged in said pole slot above said hinged attachment of said second spade, said stripper arm adapted to slidably ride on the top surface of said second spade from a position upwardly of the forked end to the end thereof upon an upward movement of the second hinged spade, said stripper arm having a centrally positioned longitudinally extending slot through which the forwardly extending arm of the second spade passes and has swinging movement therethrough.

10. A weeding device including a hand pole having a central slot extending upwardly from the bottom of the pole, a first forked end spade anchored in the bottom of said slot, a second forked end spade hinged in said pole slot above said first spade anchor, said second spade in its lowermost position engaging the top of said first spade, said second spade having a forwardly extending arm, a rod joining the outer end of said arm and extending upwardly to a position near the top of said hand pole and adapted to be manually slid along said pole to effect a raising and lowering of said second hinged spade, a stripper arm hinged in said pole slot above said hinged attachment of said second spade, said stripper arm adapted to slidably ride on the top surface of said second spade from a position upwardly of the forked end to the end thereof upon an upward movement of the second hinged spade, said stripper arm having a centrally positioned longitudinally extending slot through which the forwardly extending arm of the second spade passes and has swinging movement therethrough, and spring means arranged and constructed to normally urge said spades and stripper arm in close contacting relationship with each other.

LEO S. RINK.

REFERENCES CITED

The following references are of record in the file of this patent:

UNITED STATES PATENTS

| Number | Name | Date |
| --- | --- | --- |
| 637,091 | Cutter | Nov. 14, 1899 |
| 1,919,396 | Sadler | July 25, 1933 |
| 2,029,155 | Cervenka et al. | Jan. 28, 1936 |